US012291022B2

(12) United States Patent
Hiruma

(10) Patent No.: US 12,291,022 B2
(45) Date of Patent: May 6, 2025

(54) PRINTING APPARATUS

(71) Applicant: SEIKO EPSON CORPORATION, Tokyo (JP)

(72) Inventor: Daisuke Hiruma, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 97 days.

(21) Appl. No.: 18/477,618

(22) Filed: Sep. 29, 2023

(65) Prior Publication Data

US 2024/0109339 A1 Apr. 4, 2024

(30) Foreign Application Priority Data

Sep. 29, 2022 (JP) ................................ 2022-155982

(51) Int. Cl.
*B41J 11/00* (2006.01)

(52) U.S. Cl.
CPC .......... *B41J 11/0022* (2021.01); *B41J 11/007* (2013.01)

(58) Field of Classification Search
CPC ............................ B41J 11/0022; B41J 11/007
See application file for complete search history.

(56) References Cited

U.S. PATENT DOCUMENTS

2016/0332462 A1 11/2016 Harayama et al.
2018/0004143 A1 * 1/2018 Sasaki .................. G03G 15/605

FOREIGN PATENT DOCUMENTS

JP 2016-215428 A 12/2016

* cited by examiner

*Primary Examiner* — Bradley W Thies
(74) *Attorney, Agent, or Firm* — Dority & Manning, P.A.

(57) ABSTRACT

A printing apparatus includes: a transport unit configured to transport a medium in a transport direction; a printing unit configured to cause ink to adhere to the medium to perform printing; and a blowing device including an air blowing port and configured to blow air from the air blowing port to the medium to which the ink adheres. A guide member is disposed, at the air blowing port, downstream in an air blowing direction. Of end portions of the guide member, a third end portion that faces the medium extends along the transport direction.

8 Claims, 6 Drawing Sheets

PRINTING APPARATUS

The present application is based on and claims priority from JP Application Serial Number 2022-155982, filed on Sep. 29, 2022, the disclosure of which is hereby incorporated by reference herein in its entirety.

BACKGROUND

1. Technical Field

The present disclosure relates to a printing apparatus including a blowing device.

2. Related Art

As described in JP-A-2016-215428, there is known a printing apparatus including a blowing device configured to blow a dry air flow to a medium on which ink has been discharged, and the dry air flow is used to dry the ink. The blowing device includes an air blowing port formed so as to be opened toward the medium transported along a predetermined transport path, and air is blown from this air blowing port to the medium.

However, in a case of the printing apparatus as described in JP-A-2016-215428, the leading end of the transported medium may deviate and lift from the transport path. In addition, when the leading end of the medium lifts at or around the blowing device, the leading end of the medium gets caught at the air blowing port, which may lead to an incident in which the medium is not transport properly.

SUMMARY

A printing apparatus includes a transport unit configured to transport a medium in a transport direction, a printing unit configured to cause a liquid to adhere to the medium to perform printing, and a blowing device including an air blowing port and configured to blow air from the air blowing port to the medium to which the liquid adheres, in which a guide member is disposed, at the air blowing port, downstream in an air blowing direction, and an end portion, of the guide member, that faces the medium extends along the transport direction.

DESCRIPTION OF EMBODIMENTS

1. First Embodiment

Below, a printing apparatus 1 according to a first embodiment will be described with reference to the drawings. The printing apparatus 1 according to the present embodiment is, for example, an inkjet printer configured to discharge ink serving as one example of a liquid to a transported medium 2 such as a sheet to print an image such as a letter or a photo on the medium 2.

Figure 3:
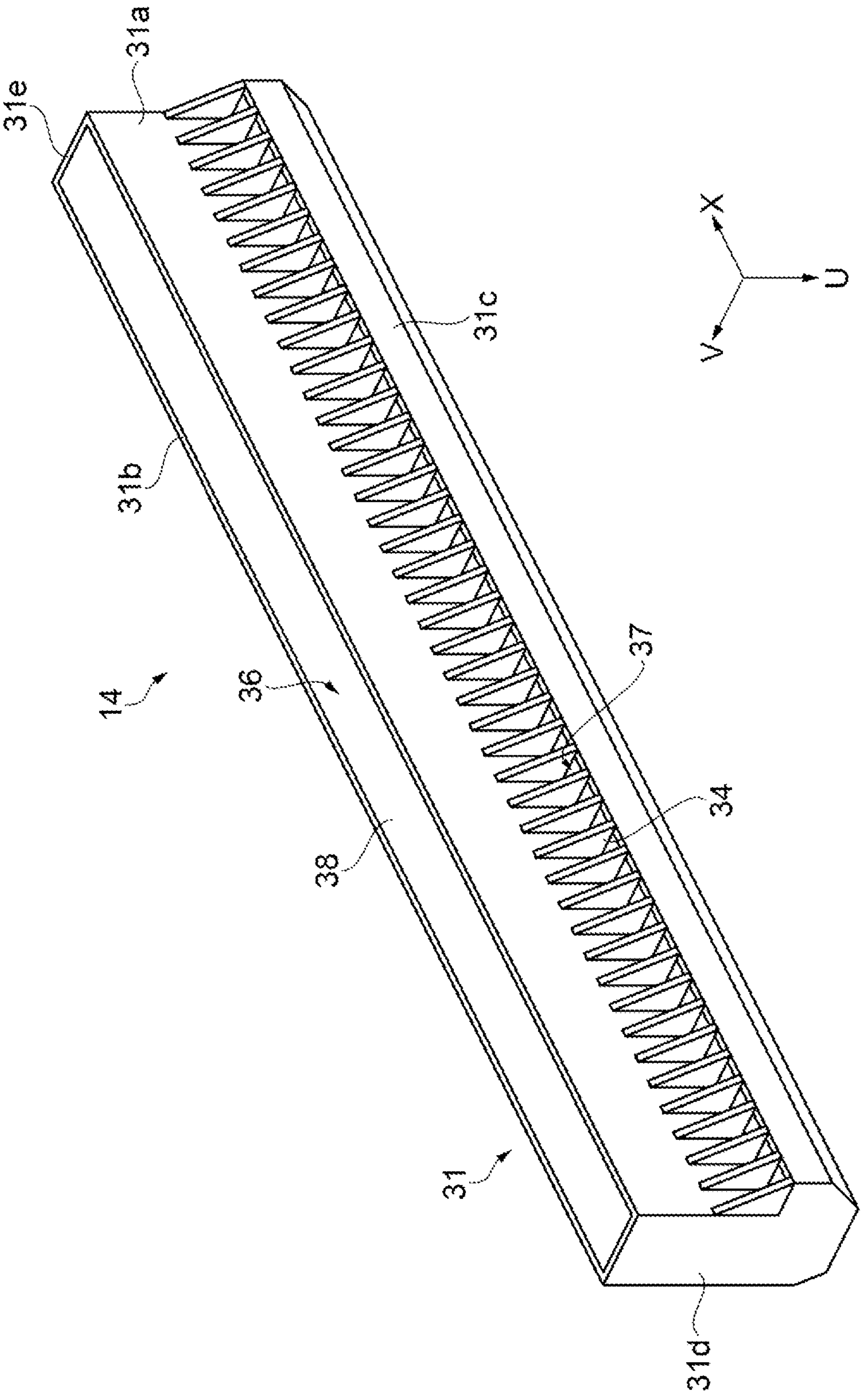
FIG. 3 is a perspective view illustrating the blowing device according to the first embodiment.

In each of the drawings except for FIG. 3, the X-axis, the Y-axis, and the Z-axis intersecting each other are illustrated. Specifically, the X-axis, the Y-axis, and the Z-axis are perpendicular to each other. The X-axis is parallel to an installation surface of the printing apparatus 1. The X-axis corresponds to the width direction of the printing apparatus 1, and corresponds to the width direction of the medium 2. The Y-axis is parallel to the installation surface of the printing apparatus 1. The Y-axis corresponds to the depth direction of the printing apparatus 1. The Z-axis is perpendicular to the installation surface of the printing apparatus 1. The Z-axis corresponds to the height direction of the printing apparatus 1.

Hereinafter, the +Y direction parallel to the Y-axis is a direction in which the medium 2 is transported in a printing unit 13 configured to discharge ink. The −Y direction parallel to the Y-axis is a direction opposite to the +Y direction. On the assumption that the transport direction is the left direction, the +X direction parallel to the X-axis is a direction heading from the near side toward the far side. The −X direction parallel to the X-axis is a direction opposite to the +X direction. The +Z direction parallel to the Z-axis is a direction heading upward. In addition, the −Z direction parallel to the Z-axis is a direction opposite to the +Z direction, and is a direction in which the printing unit 13 discharges ink. Note that, in the present specification, viewing from a direction along the X-axis is referred to as side view.

Figure 1:
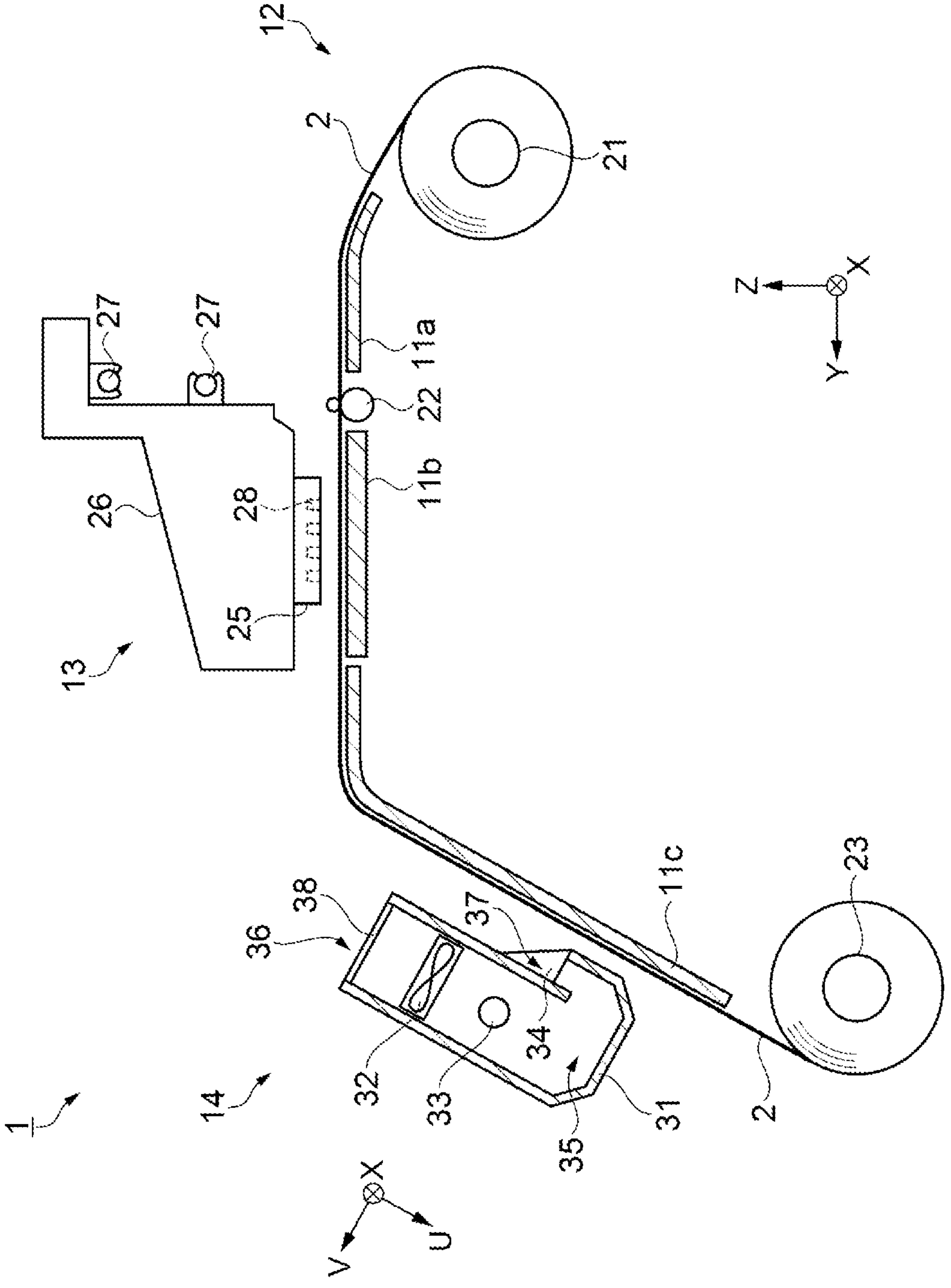
FIG. 1 is a schematic cross-sectional view illustrating a configuration of a printing apparatus according to a first embodiment.

FIG. 1 is a schematic cross-sectional view illustrating the configuration of the printing apparatus 1.

As illustrated in FIG. 1, the printing apparatus 1 includes three support portions 11*a*, 11*b*, and 11*c*, a transport unit 12, a printing unit 13, and a blowing device 14.

The support portions 11*a*, 11*b*, and 11*c* are members each configured to support the long medium 2 transported in the transport direction. The medium 2 is transported along the front surfaces of the support portions 11*a*, 11*b*, and 11*c*. That is, the transport direction in the present embodiment is a direction along the front surface of each of the support portions 11*a*, 11*b*, and 11*c*, and at the same time, is a direction intersecting the X-axis. The support portions 11*a*, 11*b*, and 11*c* are fixed at a frame or the like that is not illustrated in the drawing and is configured to support the entire printing apparatus 1.

The support portion 11*a* supports a portion, of the medium 2, upstream in the transport direction of a portion, of the medium 2, that faces the printing unit 13. In many cases, the support portion 11*a* supports a portion before being subjected to printing by the printing unit 13. The support portion 11*b* is disposed in the −Z direction of the printing unit 13 and downstream of the support portion 11*a* in the transport direction. The support portion 11*b* supports a portion, of the medium 2, on which printing is being performed by the printing unit 13. The front surface, at the +Z side, of the support portion 11*b* is substantially horizontal, and the medium 2 is transported in the +Y direction over the front surface of the support portion 11*b*. The support portion 11*c* is disposed downstream of the support portion 11*b* in the transport direction. The support portion 11*c* supports a portion, of the medium 2, downstream in the transport direction of a portion, of the medium 2, that faces the printing unit 13. The support portion 11*c* often supports a portion after being subjected to printing by the printing unit 13. The support portion 11*c* serves as one example of a medium support portion. Note that, in the drawing, the medium 2 is illustrated so as to be spaced apart from the support portions 11*a*, 11*b*, and 11*c*. However, the medium 2 is brought into contact with the support portions 11*a*, 11*b*, and 11*c*, and is transported on the front surfaces of the support portions 11*a*, 11*b*, and 11*c* in a sliding manner. In other words, the front surfaces of the support portions 11*a*, 11*b*, and 11*c* constitute a transport path for the medium 2.

The transport unit 12 is configured to transport the medium 2 in the transport direction. The transport unit 12 includes a feeding shaft 21, a transport roller 22, and a winding shaft 23. The transport unit 12 may include a plurality of transport rollers 22. The feeding shaft 21 and the winding shaft 23 are rod-shaped members each extending along the X-axis, and are each supported at both end portions in the ±X direction thereof by a frame or the like that is not illustrated in the drawing. The feeding shaft 21 and the winding shaft 23 rotatably support a roll around which the long medium 2 is wound in a tubular shape.

The feeding shaft 21 is located upstream of the transport roller 22 in the transport direction. The feeding shaft 21 rotates to unwind the medium 2 that has been wound around, thereby feeding it. With driving of a driving mechanism that is not illustrated in the drawing, the transport roller 22 transports the fed medium 2 along the support portions 11*a*, 11*b*, and 11*c*. The winding shaft 23 is located downstream of the transport roller 22 in the transport direction. The winding shaft 23 winds the transported medium 2.

The printing unit 13 causes ink to adhere to the medium 2 to perform printing. The printing unit 13 according to the present embodiment is of a serial type configured to perform printing while moving in the ±X direction that is the width direction of the medium 2. The printing unit 13 may be configured as a line type provided over the width direction of the medium 2.

The printing unit 13 includes a discharging head 25, a carriage 26, and a guide shaft 27. A plurality of nozzles 28 configured to discharge ink are formed in the discharging head 25. The guide shaft 27 is a rod-shaped member extending along the X-axis, and is supported at both end portions in the ±X direction by a frame or the like that is not illustrated in the drawing. The guide shaft 27 guides movement of the carriage 26. The carriage 26 holds the discharging head 25. With driving of a driving mechanism that is not illustrated in the drawing, the carriage 26 causes the discharging head 25 to reciprocate in the ±X direction along the guide shaft 27. The discharging head 25 discharges ink toward the medium 2 while moving, to perform printing on the medium 2.

In the present embodiment, the winding shaft 23 is located in the +Y direction and the −Z direction of the printing unit 13. For this reason, the support portion 11*c* is disposed sloped from downstream of the supporting portion 11*b* toward the winding shaft 23 in order to guide, to the winding shaft 23, the medium 2 on which printing has been performed by the printing unit 13. That is, the medium 2 on which printing has been performed by the printing unit 13 is transported along the support portion 11*c* in an oblique direction having the +Y component and the −Z component, and then, is wound by the winding shaft 23.

Hereinafter, a coordinate axis intersecting the X-axis and extending along the sloped direction of the support portion 11*c* is referred to as a U axis, and a coordinate axis intersecting the X-axis and the U axis is referred to as a V axis. Specifically, the X-axis, the U axis, and the V axis are perpendicular to each other. In addition, of directions parallel to the U axis, a transport direction for the medium 2 transported along the front surface of the support portion 11*c* is referred to as the +U direction, and the direction opposite to this direction is referred to as the −U direction. Furthermore, of directions parallel to the V axis, a direction in which the medium 2 is located as viewed from the support portion 11*c* is referred to as the +V direction, and the direction opposite to this direction is referred to as the −V direction.

Figure 2:
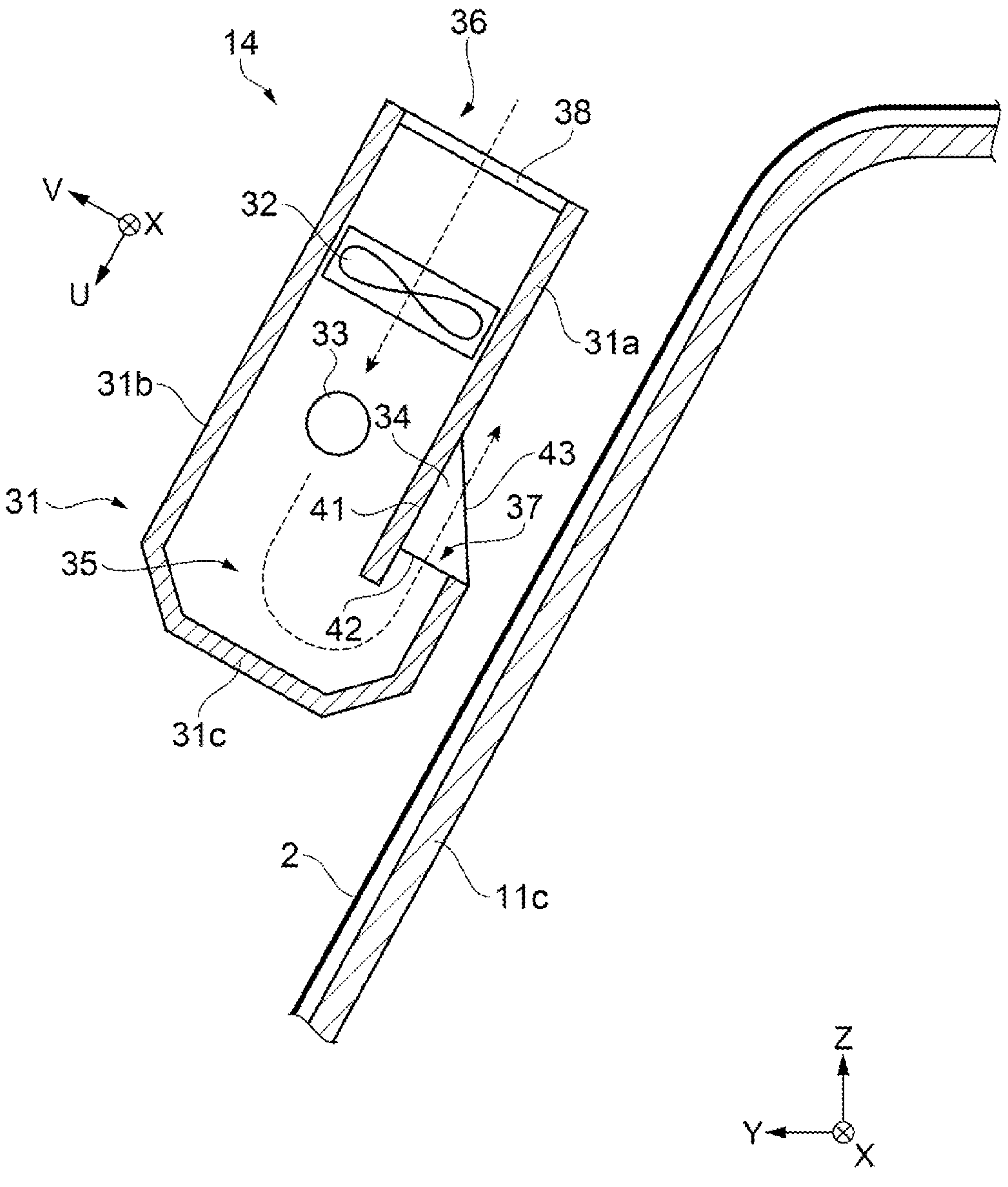
FIG. 2 is an enlarged cross-sectional view illustrating the configuration of a blowing device according to the first embodiment.

FIG. 2 is an enlarged cross-sectional view illustrating the configuration of the blowing device 14 according to the present embodiment. FIG. 3 is a perspective view of the blowing device 14.

As illustrated in FIGS. 1 to 3, the blowing device 14 is disposed at a position facing the support portion 11*c* with the medium 2 interposed therebetween. The blowing device 14 is supported by a frame or the like that is not illustrated in the drawing. The blowing device 14 blows air toward the medium 2 on which printing has been performed, that is, toward the medium 2 transported on the support portion 11*c* and supported by the support portion 11*c*, thereby drying ink adhering to the medium 2. The blowing device 14 has an elongated shape along the X-axis so as to be able to blow air to the entire region in the width direction of the medium 2. The blowing device 14 includes a flow path member 31, an air blowing fan 32, a heating unit 33, and a guide member 34.

The flow path member 31 is a member that constitutes a flow path 35 for air, and is comprised, for example, of a plate member made of metal. In addition, at corresponding ends of the flow path 35, the flow path member 31 forms an air intake port 36 where air is drawn from the outside, and an air blowing port 37 where air is blown to the outside. In other words, the blowing device 14 includes the air intake port 36 and the air blowing port 37, draws air from the air intake port 36, and blows air from the air blowing port 37 to the medium 2 to which ink adheres. In the present embodiment, the air intake port 36 and the air blowing port 37 both include an opening at the −U direction.

The flow path member 31 includes a first member 31*a*, a second member 31*b*, and a third member 31*c*. The first member 31*a* and the second member 31*b* are flat plate-shaped members disposed in a posture along the front surface of the support portion 11*c*. The first member 31*a* is disposed at a side closer to the support portion 11*c* than the second member 31*b*, that is, at the −V side. The first member 31*a* faces the medium 2 supported by the support portion 11*c*. An end portion in the +U direction of the second member 31*b* is coupled to one end of the third member 31*c*. The third member 31*c* is a member having a substantially letter −U shape and bent with the +U direction thereof being convex, and the flow path 35 is bent along this shape. The third member 31*c* is bent to surround an end portion in the +U direction of the first member 31*a*. The other end of the third member 31*c* reaches a position at the −V side that is closer to the support portion 11*c* than the first member 31*a*.

A fourth member 31*d* (see FIG. 3) along the U-V plane is coupled to end portions in the −X direction of the first member 31*a*, the second member 31*b*, and the third member 31*c*. A fifth member 31*e* (see FIG. 3) along the U-V plane is coupled to end portions in the +X direction of the first member 31*a*, the second member 31*b*, and the third member 31*c*. In addition, end portions in the −U direction of the first member 31*a*, the second member 31*b*, the fourth member 31*d*, and the fifth member 31*e* form an air intake port 36. A filter 38 used to prevent a foreign material such as dust from coming into is disposed at the air intake port 36. Furthermore, the first member 31*a*, the third member 31*c*, the fourth member 31*d*, and the fifth member 31*e* form an air blowing port 37 at the −V side of the first member 31*a*. The air blowing port 37 is located in the +U direction and the −V direction of the air intake port 36. Note that a configuration may be employed in which a plurality of members of the first member 31*a*, the second member 31*b*, the third member 31*c*, the fourth member 31*d*, and the fifth member 31*e* are integrally formed.

The air blowing fan 32 is disposed within the flow path 35. In association with driving of a motor or the like that is not illustrated in the drawing, the air blowing fan 32 rotates to generate an airflow within the flow path 35. As the air blowing fan 32 rotates to generate an airflow, the outside air is drawn from the air intake port 36 as indicated by the dashed line in the drawing, and the drawn air advances in the +U direction. After this, the direction in which the drawn air advances turns by 180° along the third member 31*c*, and is emitted from the air blowing port 37 to the −U direction. With this configuration, air is blown to the medium 2. The air blowing fan 32 is comprised, for example, of a propeller fan, a sirocco fan, a turbo fan, or the like. Note that a configuration may be employed in which a plurality of air blowing fans 32 are arrayed along the X-axis.

The heating unit 33 is disposed within the flow path 35. Specifically, the heating unit 33 is disposed upstream of the air blowing port 37 in the air blowing direction and downstream of the air blowing fan 32 in the air blowing direction. The heating unit 33 is comprised of a long heat generating element such as a heater tube. The heating unit 33 extends along the X-axis to heat air within the flow path 35. The heating unit 33 heats air within the flow path, and hence, air blown from the air blowing port 37 has a temperature higher than that of air drawn from the air intake port 36. Note that the heat generating element that constitutes the heating unit 33 is not limited to the heater tube, and may be comprised of a heating wire, a heat source lamp, or the like. In addition, the configuration of the heating unit 33 is not limited to the configuration comprised of one long heat generating element. A configuration may be employed in which a plurality of heat generating elements are arrayed along the X-axis. Furthermore, the heating unit 33 may be disposed upstream of the air blowing fan 32 in the air blowing direction. The inner surface of the flow path member 31 may be comprised of a heat insulating material.

A plurality of guide members 34 are disposed outside of the air blowing port 37, that is, at the −U side that is downstream in the air blowing direction. The guide members 34 are made of resin such as plastic or rubber, and are plate-shaped members each having a substantially right triangle shape in side view. The postures of the guide members 34 are postures along the U-V plane, and the plurality of guide members 34 having substantially the same shape are arrayed at the air blowing port 37 along the X-axis in substantially the same posture (see FIG. 3). Thus, air emitted from the air blowing port 37 passes through a space between guide members 34, and is sprayed onto the medium 2. Note that the configuration is not limited to the mode in which all the guide members 34 have the same shape and posture. For example, a mode may be employed in which the guide members 34 are different from each other in at least one of shape or posture depending on locations in the X-axis direction.

The guide member 34 includes three end portions corresponding to individual sides of the right triangle. Specifically, the guide member 34 includes a first end portion 41 extending along the U axis, a second end portion 42 extending along the V axis and substantially perpendicular to the first end portion 41, and a third end portion 43 corresponding to the hypotenuse of the right triangle.

The first end portion 41 is an end portion facing a surface, of the first member 31*a*, that faces the medium 2, in other words, the first end portion 41 is an end portion facing the external surface of the first member 31*a*. The first end portion 41 is coupled to the external surface of the first member 31*a*. The second end portion 42 is an end portion facing the air blowing port 37. The second end portion 42 extends from the first member 31*a* to an end portion in the −U direction of the third member 31*c*, crossing the air blowing port 37 along the V axis. The third end portion 43 is an end portion that faces the medium 2 supported by the support portion 11*c*. The third end portion 43 extends along the transport direction of the medium 2. Specifically, the third end portion 43 is comprised of a side coupling the top end in the −U direction of the first end portion 41 and the top end in the −V direction of the second end portion 42, and extends in an oblique direction relative to the U axis and the V axis. More specifically, the third end portion 43 is sloped to approach the support portion 11*c* and the medium 2 toward the +U direction that is the transport direction. In other words, on the third end portion 43, of any given two portions that are spaced apart from each other in the transport direction, a distance from the support portion 11*c* and a first portion located upstream in the transport direction is longer than a distance from the support portion 11*c* and a second portion located downstream in the transport direction. The third end portion 43 serves as one example of an "end portion that faces the medium".

In a case of the printing apparatus 1 as described above, even when the leading end in the transport direction of the medium 2 transported on the support portion 11*c* unintentionally lifts from the support portion 11*c*, the leading end of the medium is brought into contact with the third end portion 43 of the guide member 34, and hence, does not enter the air blowing port 37. In addition, since this third end portion 43 extends along the transport direction, the leading end of the medium 2 that is brought into contact with the guide member 34 is guided in the originally intended transport direction by the guide member 34. Furthermore, the distance from the third end portion 43 of the guide member 34 to the support portion 11*c* is shorter toward downstream in the transport direction, and hence, the third end portion 43 guides the leading end of the medium 2 so as to head toward the support portion 11*c*.

As described above, with the printing apparatus 1 according to the present embodiment, it is possible to obtain the following effects.

With the present embodiment, the guide member 34 is provided downstream of the air blowing port 37 configured to blow air to the medium 2, and of the end portions of the guide member 34, the third end portion 43 that faces the medium 2 extends along the transport direction of the medium 2. Thus, when the leading end of the medium 2 on which printing has been performed deviates from the originally intended transport path and gets closer to the air blowing port 37, the medium 2 is guided by the guide member 34 to the originally intended transport direction. This makes it possible to suppress catching of the medium 2 at the air blowing port 37, thereby suppressing blockage of the normal transport of the medium 2. In addition, since the medium 2 does not get caught at the air blowing port 37, it is possible to dispose the blowing device 14 so as to be close to the medium 2. This makes it possible to efficiently dry the medium 2.

Furthermore, with the present embodiment, the plurality of guide members 34 are arrayed downstream of the air blowing port 37 and along the X-axis. This makes it possible to further suppress catching of the medium 2 at the air blowing port 37. In addition, as the airflow emitted from the air blowing port 37 is straightened by the plurality of guide members 34, it is possible to efficiently blow air.

Furthermore, with the present embodiment, the third end portion 43, of the guide member 34, that faces the medium 2 is sloped to approach the support portion 11*c* toward downstream in the transport direction of the medium 2. This makes it possible to return, back to the support portion 11*c*, the medium 2 that deviates from the support portion 11*c* and heads toward the air blowing port 37.

In addition, with the present embodiment, the blowing device 14 blows, to the medium 2, air heated by the heating unit 33. This makes it possible to efficiently dry the medium 2 on which ink has been discharged.

Furthermore, with the present embodiment, the heating unit 33 is disposed downstream of the air blowing fan 32. This makes it possible to suppress damage to the air blowing fan 32 due to the heat generated by the heating unit 33.

In addition, with the present embodiment, the guide member 34 is made of resin that is a material having relatively low thermal conductivity. Thus, even when the temperature at or around the air blowing port 37 increases due to the heat generated by the heating unit 33, it is possible to suppress increase in temperature of the guide member 34 itself. Thus, when a finger of a user or the leading end of the medium 2 is brought into contact with the guide member 34, it is possible to suppress excessive heat transfer to the finger or the medium 2. Note that it is only necessary that at least the front surface of the guide member 34 is made of resin. For example, a configuration may be employed in which a front surface made of a metal material is covered with resin.

2. Second Embodiment

Below, a printing apparatus 1 according to a second embodiment will be described with reference to the drawings.

Figure 4:
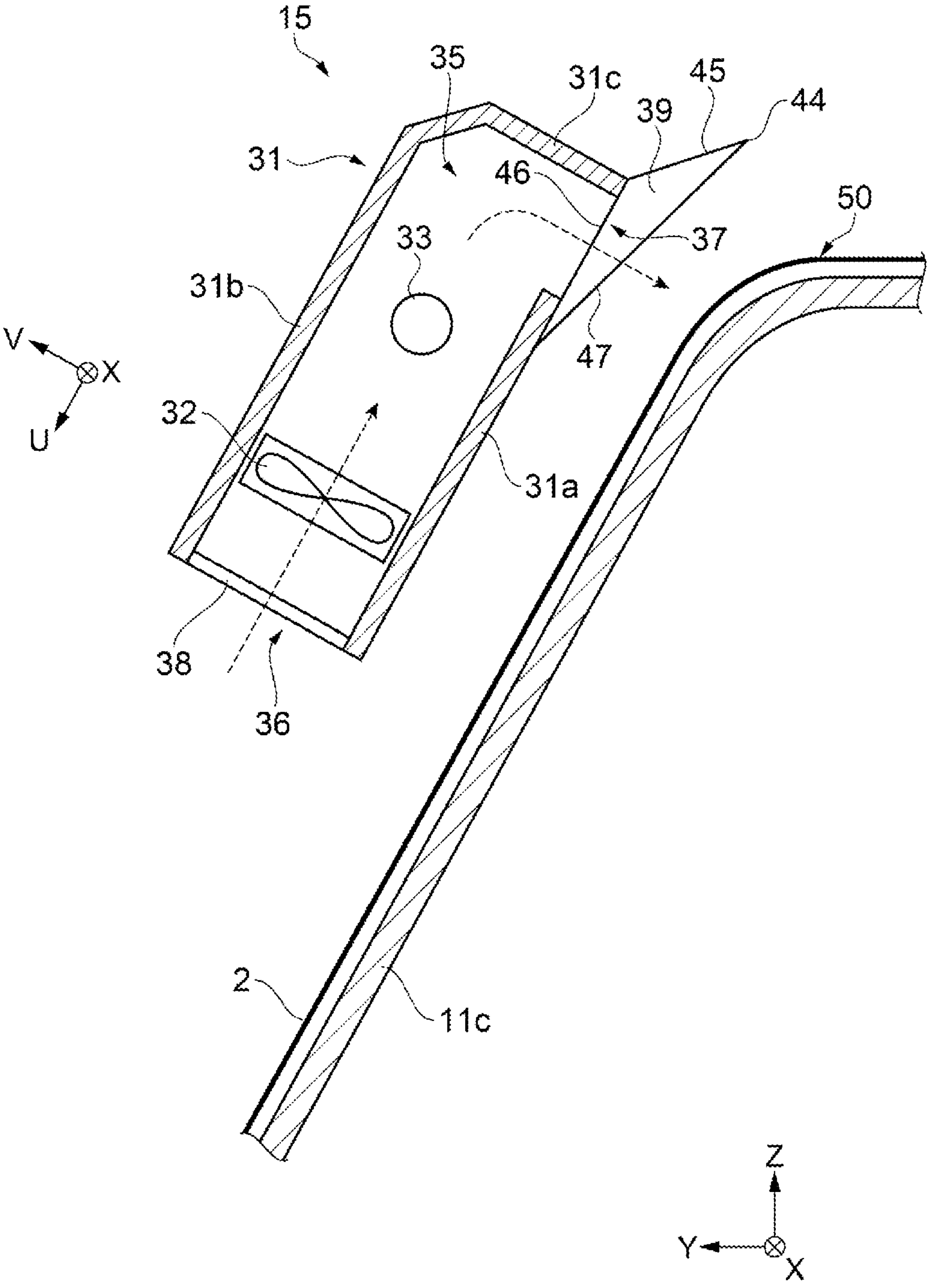
FIG. 4 is an enlarged cross-sectional view illustrating a configuration of a blowing device according to a second embodiment.

FIG. 4 is an enlarged cross-sectional view illustrating the configuration of a blowing device 15 included in the printing apparatus 1 according to the second embodiment.

As illustrated in FIG. 4, the blowing device 15 according to the present embodiment differs from the first embodiment in that the blowing device 15 according to the present embodiment is configured to draw the outside air from the air intake port 36 formed at the +U side of the flow path member 31, and blow air, toward the −V direction, from the air blowing port 37 disposed at the −U side of the air intake port 36. Note that description will not be made of configurations common to those of the first embodiment.

The flow path member 31 according to the present embodiment includes the first member 31*a*, the second member 31*b*, and the third member 31*c*, as in the first embodiment. The first member 31*a* and the second member 31*b* are flat plate-shaped members disposed in a posture along the front surface of the support portion 11*c*. The first member 31*a* is disposed at a side closer to the support portion 11*c* than the second member 31*b*, that is, at the −V side. The first member 31*a* faces the medium 2 supported by the support portion 11*c*. An end portion in the −U direction of the second member 31*b* is coupled to one end of the third member 31*c*. The third member 31*c* is a member configured to bend the flow path 35. The other end of the third member 31*c* is located farther in the −U direction than the end portion in the −U direction of the first member 31*a*.

The fourth member 31*d* and the fifth member 31*e* (not illustrated) along the U-V plane are coupled to end portions in the ±X direction of the first member 31*a*, the second member 31*b*, and the third member 31*c*, as in the first embodiment. In addition, end portions in the +U direction of the first member 31*a*, the second member 31*b*, the fourth member 31*d*, and the fifth member 31*e* form the air intake port 36. A filter 38 used to prevent a foreign material such as dust from coming into is disposed at the air intake port 36. Furthermore, the first member 31*a*, the third member 31*c*, the fourth member 31*d*, and the fifth member 31*e* form the air blowing port 37 at the −U side of the first member 31*a*. In other words, the air blowing port 37 is located in the −U direction of the air intake port 36.

A guide member 39 having a triangle shape in side view is disposed at the outside of the air blowing port 37, that is, at the −V side that is downstream in the air blowing direction. The posture of the guide member 39 is a posture along the U-V plane. At the air blowing port 37, a plurality of guide members 39 having substantially the same shape are arrayed along the X-axis in substantially the same posture. A corner portion 44 corresponding to one vertex of a triangle is located in the −U direction and the −V direction of the air blowing port 37. That is, the guide member 39 protrudes from the air blowing port 37 in an oblique direction having a −U component and a −V component.

The guide member 39 includes a first end portion 45, a second end portion 46, and a third end portion 47 corresponding to individual sides of a triangle. The first end portion 45 is an end portion comprised of a side coupling the corner portion 44 and an end portion in the −V direction of the third member 31*c* that constitutes the air blowing port 37. The second end portion 46 is an end portion facing the air blowing port 37. The second end portion 46 extends from the end portion in the −V direction of the third member 31*c* to the first member 31*a*, crossing the air blowing port 37 along the U axis. The third end portion 47 is an end portion that faces the medium 2 supported by the support portion 11*c*, and extends along the transport direction of the medium 2. Specifically, the third end portion 47 is an end portion comprised of a side coupling the corner portion 44 and the tip end in the +U direction of the second end portion 46.

As illustrated in FIG. 4, the blowing device 15 according to the present embodiment is disposed, for example, in the vicinity of a curved portion 50 of which transport direction is curved into a convex shape. Specifically, the curved portion 50 is a position where a change of the transport direction starts from the +Y direction below the printing unit 13 into the +U direction along the support portion 11*c*. In such a configuration, when, at the curved portion 50, the medium 2 advances in a straight line in the +Y direction without changing its transport direction, the medium 2 is brought into contact with the third end portion 47 of the guide member 39, and is guided to the +U direction that is the originally intended transport direction.

As described above, with the printing apparatus 1 according to the present embodiment, it is possible to obtain effects similar to those in the first embodiment.

Note that the positions of the air intake port 36 and the air blowing port 37, the air blowing direction from the air blowing port 37, and the shapes of the guide members 34 and 39 are not limited to the configurations described in the first and second embodiments as examples, and are freely selected. In addition, the sloped directions of the third end portions 43 and 47 of the guide members 34 and 39 are not limited to the configuration described above. The third end portions 43 and 47 are only necessary to be sloped such that the medium 2 deviated from the originally intended transport path and traveling toward the air blowing port 37 is returned back to the originally intended transport path.

Each of the embodiments described above may be modified in the following manner.

Figure 5:
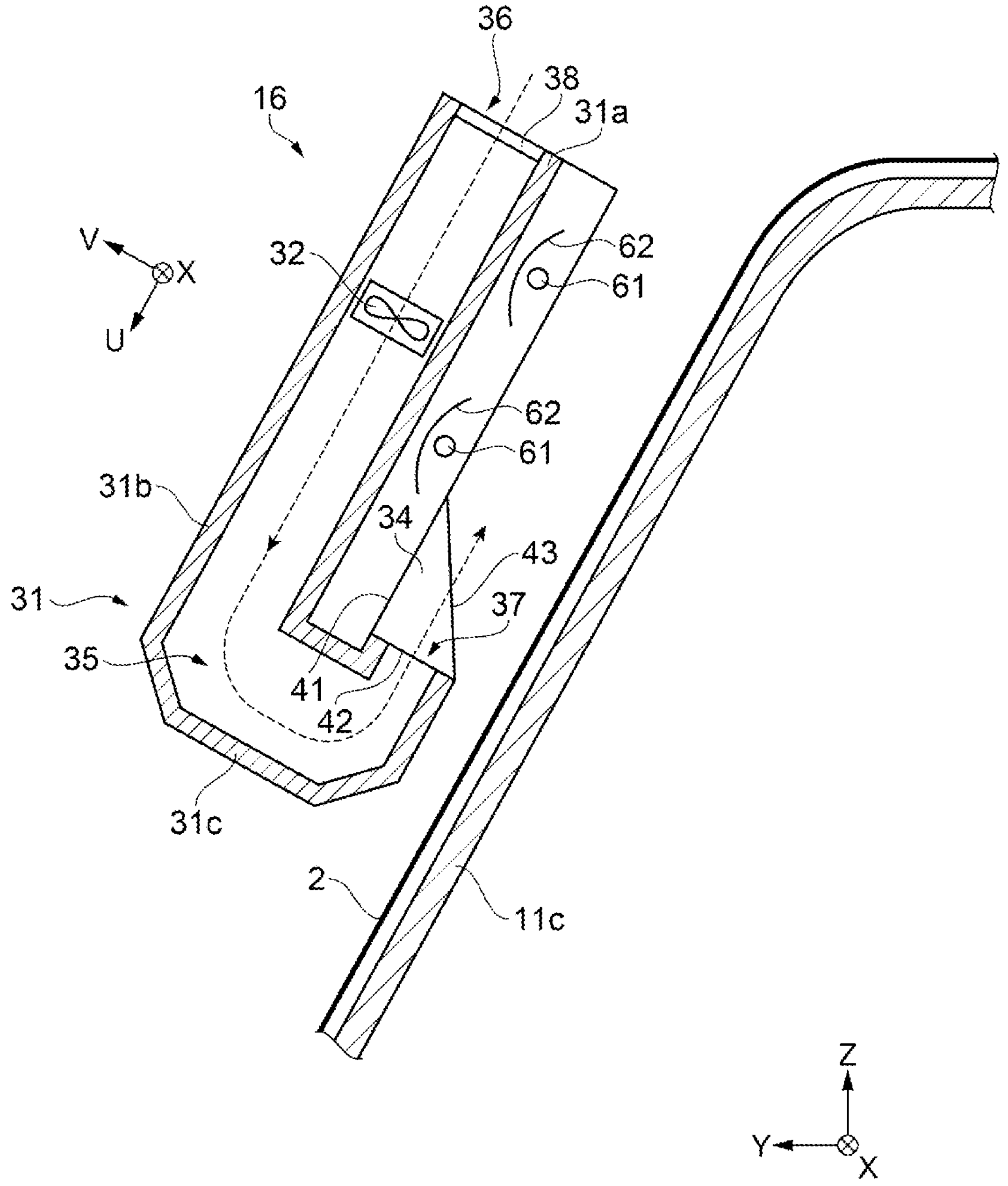
FIG. 5 is an enlarged cross-sectional view illustrating a configuration of a blowing device according to a modification example.

The embodiments described above indicate the configuration in which the heating unit 33 configured to heat air within the flow path 35 is disposed within the flow path 35. However, the configuration of the blowing device is not limited to this. For example, a configuration may be employed in which a heating unit 61 used to heat the medium 2 is provided at the outside of the flow path 35, that is, at the outside of the flow path member 31, as with the blowing device 16 illustrated in FIG. 5. In addition, a configuration may be employed in which a reflecting mirror 62 is provided to efficiently heat the medium 2 using the heat generated by the heating unit 61. In this case, the reflecting mirror 62 may be disposed in the +V direction of the heating unit 61, which is a direction opposite to a direction in which the medium 2 is located. This makes it possible to reflect the heat radiated to the +V side from the heating unit 61, to the −V side where the medium 2 is located. Furthermore, part of the heat generated by the heating unit 61 is transferred through the first member 31*a* to the inside of the flow path 35, and hence, it is possible to also heat air within the flow path 35 by the heating unit 61, that is, heat the air used to be blown to the medium 2. In addition, although illustration is not given, a configuration may be employed in which the heating unit 61 configured to heat the medium 2 is provided at the support portion 11*c* side. In this case, the heating unit 33 or 61 may not be provided at the blowing device 14.

Figure 6:
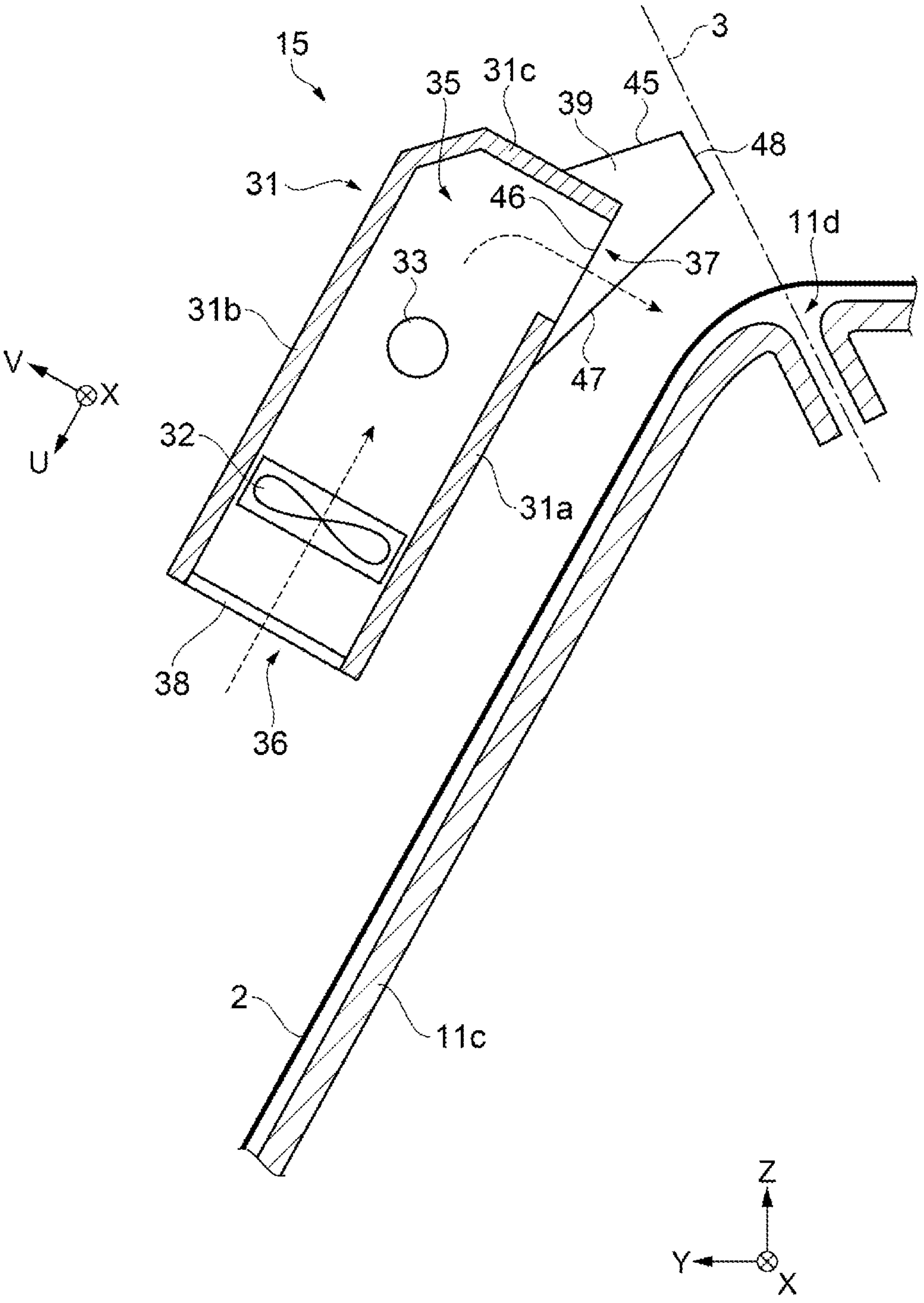
FIG. 6 is an enlarged cross-sectional view illustrating a configuration of a blowing device according to a modification example.

In the second embodiment described above, when a cutter groove 11*d* (see FIG. 6) used to cut the medium 2 is provided at any of the support portions 11*b* and 11*c*, a configuration may be employed in which the guide member 39 has a function of helping the cutting operation. The cutter groove 11*d* extends in the X-axis, and a user uses a commercially available cutter or the like. A blade 3 of the cutter is engaged with the cutter groove 11*d* at the outer side of the medium 2 in the +X direction or the −X direction. Then, the cutter is moved along the X-axis direction. This makes it possible to cut the medium 2. In the configuration illustrated in FIG. 6, the tip portion of the guide member 39 is configured so as to be able to be brought into contact with the side surface of the blade 3 of the cutter in a state of being engaged with the cutter groove 11*d*. With this configuration, it is possible to perform an operation of moving the blade 3 of the cutter along the X-axis direction while receiving a help of the guide member 34. This makes it possible to perform a stable cutting operation. In addition, as illustrated in FIG. 6, when the guide member 39 includes a fourth end portion 48 provided at the tip portion and extending substantially parallel to the blade 3 of the cutter in a state of being engaged with the cutter groove 11*d*, it is possible to more stabilize the posture of the blade 3 of the cutter, which makes it easier to perform the cutting operation.

In each of the embodiments described above, the number of guide members 34 and 39 arrayed along the X-axis is freely selected. For example, even with the configuration in which one guide member 34, 39 is disposed at or around the center of the air blowing port 37 in the X-axis direction, it is possible to suppress entry of the medium 2 into the air blowing port 37. However, in order to more reliably prevent entry of the medium 2, a plurality of guide members 34, 39 may be disposed at predetermined intervals. Furthermore, when the air blowing fan 32 or the heating unit 33 is disposed at or around the air blowing port 37, or when there is a possibility that the air blowing port 37 itself has a high temperature, the intervals between guide members 34, 39 may be narrowed such that a finger of the user who performs maintenance or the like does not reach the air blowing port 37. Specifically, the intervals between guide members 34, 39 in this case, that is, the width of the intervals may be equal to or less than 10 mm, and may be equal to or less than 7 mm.

In each of the embodiments described above, emboss processing may be applied to the front surface of the guide member 34, 39 to form small asperities thereon. With this configuration, even in a case where the guide member 34, 39 itself has a relatively high temperature due to the heat generated by the heating unit 33, it is possible to suppress excessive heat transfer to a finger of a user or the leading end of the medium 2 when the finger or the leading end of the medium 2 is brought into contact with the guide member 34, 39.

In each of the embodiments described above, a configuration may be employed in which a protruding that protrudes in a direction along the X-axis is provided on the front surface of the guide member 34, 39 that intersects the X-axis, that is, on the front surface along the U-V plane. With this configuration, the protruding is formed at the front surface of the guide member 34, 39. This facilitates separation of an airflow delivered from the air blowing port 37 along the guide member 34, 39. This makes it possible to improve air blowing efficiency or reduce noise.

In each of the embodiments described above, the guide member 34, 39 is made of resin that is a material having relatively low thermal conductivity. However, the material of the guide member 34, 39 is not limited to resin. For example, the guide member 34, 39 may be made of a material such as a metal having relatively high thermal conductivity when the blowing device 14, 15, 16 has a structure in which a user is difficult to touch the guide member 34, 39, or when damage caused by heat of the guide member 34, 39 to the medium 2 that is brought into contact with the guide member 34, 39 is small to the extent that the damage can be ignored. In this case, heat is dissipated from the guide member 34, 39 to air emitted from the air blowing port 37. Thus, it is possible to efficiently heat the delivered air. Furthermore, by employing a configuration in which part of the heat generated by the heating unit 33 or waste heat from a motor that drives the air blowing fan 32 is transferred to the guide member 34, 39, it is possible to further improve the efficiency in utilizing heat.

In each of the embodiments described above, the liquid discharged by the printing unit 13 is not limited to ink. For example, the printing unit 13 may discharge an electrode material used to manufacture various types of displays or a liquid body containing a material such as a color material in a dispersed state or dissolved state.

In the embodiments described above, the printing method of the printing unit 13 is not limited to an inkjet method in which a liquid is ejected. For example, a printing method may be employed in which a plate is used to cause a liquid to adhere to the medium 2.

What is claimed is:

1. A printing apparatus comprising:

a transport unit configured to transport a medium in a transport direction;

a printing unit configured to cause a liquid to adhere to the medium to perform printing; and a blowing device including an air blowing port and configured to blow air from the air blowing port to the medium to which the liquid adheres, wherein a guide member is disposed, at the air blowing port, downstream in an air blowing direction and an end portion, of the guide member, that faces the medium extends along the transport direction.

2. The printing apparatus according to claim 1, wherein a plurality of the guide members are arrayed, downstream of the air blowing port in the air blowing direction, along a width direction of the medium intersecting the transport direction.

3. The printing apparatus according to claim 1, further comprising a medium support portion configured to support the medium at a position facing the blowing device, wherein the end portion, of the guide member, that faces the medium is sloped to approach the medium support portion toward downstream in the transport direction.

4. The printing apparatus according to claim 1, wherein the blowing device includes a heating unit upstream of the air blowing port in the air blowing direction.

5. The printing apparatus according to claim 4, wherein the blowing device includes an air blowing fan configured to generate an airflow and the heating unit is disposed downstream of the air blowing fan in the air blowing direction.

6. The printing apparatus according to claim 4, wherein at least a front surface of the guide member is made of resin.

7. The printing apparatus according to claim 4, wherein emboss processing is applied to a front surface of the guide member.

8. The printing apparatus according to claim 1, wherein a protrusion is formed at a front surface, of the guide member, that intersects a width direction of the medium.

* * * * *